United States Patent [19]

Keener

[11] Patent Number: 4,964,222
[45] Date of Patent: Oct. 23, 1990

[54] RING SIZER

[76] Inventor: Robert L. Keener, 3115 Furneaux Rd., Carrollton, Tex. 75007

[21] Appl. No.: 467,186

[22] Filed: Jan. 19, 1990

[51] Int. Cl.⁵ .............................................. G01B 3/00
[52] U.S. Cl. .......................................... 33/544.4; 29/8
[58] Field of Search ................. 33/542, 543, 544.4, 33/555.1, 561.2; 29/8; 269/47

[56] References Cited

U.S. PATENT DOCUMENTS

| | | | |
|---|---|---|---|
| 343,582 | 6/1886 | Harwood | 33/544.4 |
| 1,210,963 | 1/1917 | Mascher | 33/544.4 |
| 2,830,376 | 4/1958 | Menoher | 33/542 |
| 3,618,218 | 11/1971 | Harris, Sr. | 33/542 |

Primary Examiner—Lowell A. Larson
Attorney, Agent, or Firm—Johnson & Gibbs

[57] ABSTRACT

A ring sizer which closely conforms to any ring shape thereby permitting correct sizing of a ring being measured. At least the surface portions of the ring sizer are elastic and adapted to distort locally to the extent necessary for complete conformity with the inner surface of a ring placed thereon and in frictional contact therewith.

9 Claims, 1 Drawing Sheet

RING SIZER

FIELD OF THE INVENTION

This invention relates to a device for measuring the size of a ring. More particularly, this invention relates to a ring-measuring device which can be used by jewelers to ascertain the true size of any odd-shaped ring.

BACKGROUND OF THE INVENTION

Ring-measured devices are widely used by jewelers in making and selling rings to their customers. These devices typically consist of short metal (hollow or solid) or plastic sticks having no flexibility. The sticks are generally shaped in a conical fashion and indexed sequentially in quarter or half sizes, generally from one to fifteen (1-15). The size of a given ring can be ascertained by introducing that ring over the stick and sliding it along the scale as far as possible until a maximum indicia is reached. The size of the ring can therefore be ascertained simply by noting the position of the ring with respect to the scale.

Where the size of the finger is not known and no ring is available that indicates size, a set of gauge rings is usually used to ascertain the size of the finger. The gauge rings are generally formed to metal and are arranged in order of their diameters from the smallest to the largest. By selecting one gauge ring after another, the appropriate size can be gauged when a proper fit is obtained. The gauge rings themselves may be marked with size indicia or alternatively, the size of the selected gauge ring may be ascertained by using a ring measuring device as illustrated above.

The devices heretofore described cannot accurately measure the size of a non-circular ring. Because they are made of inflexible or non-yieldable material, these devices are not capable of conforming to out-of-round ring shapes. Most rings actually sold by jewelers are not preferably circular but instead have a flattened portion at the set of the ring. Even if a ring was perfectly circular when sold imperfections are bound to occur with continued wear since the human finger is generally not circular itself. An attempt to address these difficulties may be seen in U.S. Pat. No. 467,382 issued to Mortimer L, Clopton (the "Clopton Ring Gauge"). The Clopton Ring Gauge was constructed from a single sheet of flexible elastic material and wrapped upon itself to provide a hollow, cone-shaped body. The body was provided with a scale indicating the different sizes of rings to be measured. In principle, the Clopton Ring Gauge was intended to yield and conform itself to a ring brought in frictional contact with it and to return to its initial condition when the ring was withdrawn.

The Clopton Ring Gauge, however, falls short of its own objectives. Its cross-sectional design contemplates a series of concentric circles, one wrapped around another, which yield to the inner surface of a ring so that the proper size can be ascertained. While this design does afford flexibility, it does not enable accurate measurement of a non-circular ring. To the contrary, the area of the Clopton Ring Gauge in frictional contact with the ring would inherently tend to remain more round than the shape of the inner surface of the ring being measured. Furthermore, the local contact area is progressively less likely to return to its initial condition with each instance of additional usage. Indeed, the Clopton Ring Gauge's resistance to local distortion is inversely related to the amount of force used to push the ring up the scale of the Ring Gauge. In other words, the stronger the force, the greater the distortion and the smaller the likelihood that the Ring Gauge will return to its initial condition.

It is therefore an object of this invention to provide a ring sizer which can distort locally to accommodate any ring shape while resisting distortion sufficiently to allow measurement of the true size of the ring. It is also an object of this invention to provide a ring sizer which reduces or eliminates the inaccuracies of measurements performed with conventional ring-measuring devices.

SUMMARY OF THE INVENTION

A ring sizer comprising a tapered stick wherein at least the surface portions thereof are made of a pliable material and adapted to distort locally to accommodate the contour of a ring being sized while resisting distortion sufficiently to enable correct sizing of the ring regardless of whether the ring being sized has a circular or, as is more often the case, a non-circular or odd-shape.

DETAILED DESCRIPTION OF THE INVENTION

Figure 1:
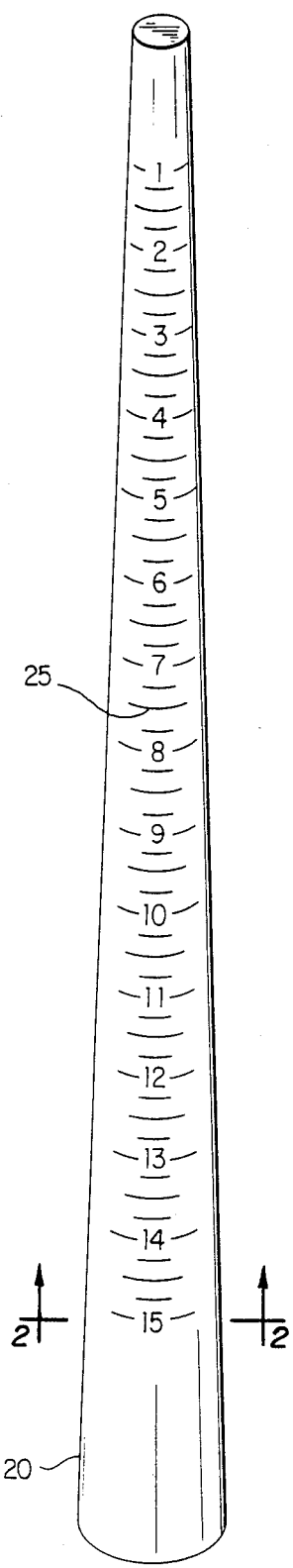
FIG. 1 is a perspective view of a ring sizer constructed in accordance with the teachings of the present invention.

Referring first to FIG. 1, a perspective view of a ring sizer constructed in accordance with the teachings of the present invention may now be seen. The ring sizer comprises a stick 20 having a generally cylindrical shape and a diameter which tapers from one end of the stick to the other, the largest being of greater circumference than the largest ring desired to be measured and the other end being of smaller circumference than the smallest ring desired to be measured. Along the inclined surface of the stick 20, a scale 25 is formed of any desired number of parts (here shown from 1 to 15, inclusive) and with subdivisions of halves and quarters. To measure the size of a given ring, the ring is drawn over the smallest end of the ring sizer and advanced up the scale 25 (downward with respect to the representation in FIG. 1) until no further movement is possible. The exact ring size may readily be ascertained by reading the scale 25 at the point where it engages the ring.

Figure 2:
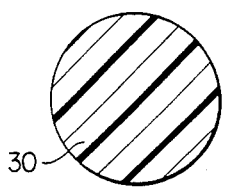
FIG. 2 is a transverse sectional view of the embodiment of the present invention shown in FIG. 1, the section being taken along the line 2—2 of FIG. 1.

Referring next to FIG. 2, a transverse sectional view of a first embodiment of the present invention may now be seen. In this embodiment, the stick 20 is made from a pliable, substantially seamless material 30, for example, flexible plastic. Such material is elastic so that a ring forced thereon will cause it to yield to the pressure exerted by the ring but only to the extent necessary to conform itself to the shape of the ring. When the ring is withdrawn and pressure is released, such material will return to its initial position without physically retaining any of the distortion occasioned by frictional contact with the ring.

Figure 3:
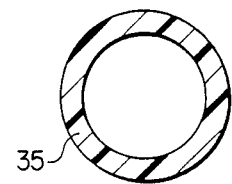
FIG. 3 is a transverse sectional view of a second embodiment of the present invention, the section being taken as in FIG. 2.

Referring next to FIG. 3, a transverse sectional view of a second embodiment of the present invention may now be seen. In this embodiment, the stick 20 comprises a hollow tube 35 made from a pliable, substantially seamless material. Thus, whereas the stick in FIG. 2 has a uniform cross section, the stick in FIG. 3 consists of a hollow cylinder surrounded by an elastic material. The thickness of the surface portions may be varied as desired so long as a sufficient buffer of elastic material exists to accommodate the contour of the ring being sized and to distort locally in symmetry with the inner surface of the ring.

It may easily be seen that the interior of the hollow tube 35 of FIG. 3 may be filled with a different pliable material than the surface portions without departing in the least from the concept of the present invention. Thus, for example, the stick may have a rubber interior surrounded by flexible plastic.

Figure 4:
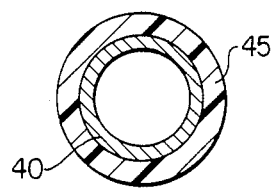
FIG. 4 is a transverse sectional view of a third embodiment of the present invention, the section being taken as in FIG. 2.

Referring next to FIG. 4, a transverse sectional view of a third embodiment of the present invention may now be seen. In this embodiment, the stick 20 includes a rod 40 made from a rigid material such as from a sheet of metal. A shell 45 made from a pliable material such as from a sheet of flexible plastic, surrounds and contains the rod 40. According to the configuration shown in FIG. 4, the rod 40 is a hollow tube having a metallic or other hand surface. This configuration is generally similar in structure to that illustrated in FIG. 3, except for the introduction of the hollow rod 40. The present embodiment may be used, for example, to enhance the durability of the ring sizer.

Figure 5:
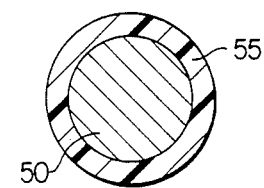
FIG. 5 is a transverse sectional view of a fourth embodiment of the present invention, the section being taken as in FIG. 2.

Referring next to FIG. 5, a transverse sectional view of a fourth embodiment of the present invention may now be seen. In this embodiment, the hollow rod 40 of FIG. 4 has been replaced with a solid rod 50 made from similar material i.e., metal or the like. Analogous to FIG. 4, a shell 55 made from a pliable material surrounds and contains the rod 50. The present embodiment may be used, for example, to facilitate convenience of handling by providing additional weight and resiliency.

Figure 6:
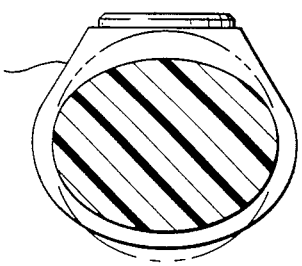
FIG. 6 is a side view of a non-circular ring being sized with the present invention.

Referring next to FIG. 6, a side view of a non-circular ring being sized with the present invention may now be seen. FIG. 6 shows an embodiment of the present invention in accordance with FIG. 2. A ring 60 has been fitted over a ring sizer and is in frictional contact with the surface as previously described in connection with FIG. 1. As illustrated by the dotted lines, the inner surface of the ring 60 is not a true circle but is rather generally oval in shape. It may be seen that because of its construction, the present invention adapts to the ring being sized by distorting locally into the exact shape of the ring's inner surface. In this manner, the correct size of any odd-shaped rimg may easily be ascertained.

Figure 7:
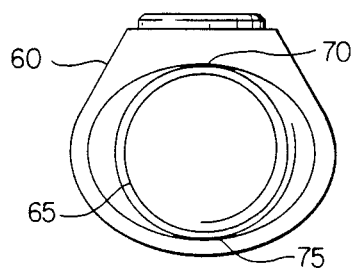
FIG. 7 is a side view of a ring being sized with a device from the prior art.

Referring next to FIG. 7, a side view of a ring being sized with a device from the prior art may now be seen. Here, a Ring Gauge 65 constructed in accordance with the Clopton invention (referred to earlier) may be seen in cross section. In contrast to the present invention, the Clopton Ring Gauge 65 does not adapt perfectly to the ring 60 since only a few of the surface portions 70, 75 are in frictional contact with the inner surface of the ring 60. The contact surface portions 70, 75 are relatively small as compared with the inner surface of the ring 60. This result directly follows from the spiral yet circular nature of the Clopton Ring Gauge. Consequently, while the Clopton Ring Gauge was a significant improvement over existing devices, it did not and does not enable a true and correct sizing of an odd-shaped ring as is possible with the present invention.

Thus, there has been described and illustrated herein a ring sizer which closely conforms to any ring shape thereby permitting correct sizing of the ring being measured. However, those skilled in the art will recognize that many modifications and variations besides those mentioned specifically may be made in the technique described herein without departing substantially from the spirit and scope of the present invention. Accordingly, it should be clearly understood that the form of the invention described herein is exemplary only, and is not intended as a limitation on the scope of the present invention.

What is claimed is:

1. A ring sizer comprising a generally cylindrical stick having a diameter which tapers from one end thereof to the other, said stick being formed of pliable, substantially seamless material and adapted to distort locally to accommodate the contour of a ring being sized while resisting distortion sufficiently to enable correct sizing of said ring.

2. A stick according to claim 1 having graduated sizing indicia along the external surface thereof for measuring the circumference of said ring.

3. A stick according to claim 1 in which at least the surface portions thereof are formed of a different pliable material than the interior portions.

4. A stick according to claim 3 wherein said surface portions are formed of flexible plastic.

5. A ring sizer comprising a generally cylindrical stick having a diameter which tapers from one end thereof to the other, said stick further comprising a rod formed of rigid material; and a shell formed of pliable material, said shell surrounding said rod and adapted to distort locally to accommodate the contour of a ring being sized while resisting distortion sufficiently to enable correct sizing of said ring.

6. A shell according to claim 5 having graduated sizing indicia along the external surface thereof for measuring the circumference of said ring.

7. A shell according to claim 5 which is formed of flexible plastic.

8. A rod according to claim 5 in which at least the surface portions thereof are formed of metal.

9. A rod according to claim 5 in which at least the surface portions thereof are formed of hard plastic.

* * * * *